United States Patent
Zheng et al.

(10) Patent No.: US 8,317,383 B2
(45) Date of Patent: Nov. 27, 2012

(54) FASTENING DEVICE FOR LIGHT PIPE ASSEMBLY

(75) Inventors: Lei Zheng, Shenzhen (CN); Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 533 days.

(21) Appl. No.: 12/493,141

(22) Filed: Jun. 26, 2009

(65) Prior Publication Data

US 2010/0149831 A1 Jun. 17, 2010

(30) Foreign Application Priority Data

Dec. 11, 2008 (CN) .......................... 2008 1 0306169

(51) Int. Cl.
*F21V 8/00* (2006.01)
(52) U.S. Cl. ....................................... 362/581; 362/396

(58) Field of Classification Search .................. 362/581, 362/396, 432, 457
See application file for complete search history.

(56) References Cited

U.S. PATENT DOCUMENTS

| | | | |
|---|---|---|---|
| 5,938,324 A * | 8/1999 | Salmon et al. | 362/555 |
| 7,287,896 B2 | 10/2007 | Okamoto et al. | |
| 2005/0270794 A1 * | 12/2005 | Okamoto et al. | 362/555 |

FOREIGN PATENT DOCUMENTS

| | | |
|---|---|---|
| CN | 1690748 A | 11/2005 |
| CN | 201093347 Y | 7/2008 |

* cited by examiner

*Primary Examiner* — Sharon Payne
(74) *Attorney, Agent, or Firm* — Altis Law Group, Inc.

(57) ABSTRACT

A fastening device for fastening a light pipe assembly including a number of light pipes includes a chassis including two opposite hooks, and two pairs of blocks extending from two of the number of light pipes, respectively. When the light pipe assembly is compressed to be elastically deformed, the light pipe assembly is able to be placed between the hooks. When the light pipe assembly restores, each hook is able to be sandwiched between two blocks of a corresponding pair of blocks.

3 Claims, 3 Drawing Sheets

FASTENING DEVICE FOR LIGHT PIPE ASSEMBLY

BACKGROUND

1. Technical Field

The disclosure relates to a fastening device for fastening a light pipe assembly.

2. Description of Related Art

Light pipes have been widely used in household electrical appliances and electronic equipment, because light pipes have lower transmission loss in transmitting light and are light weight. Light pipes are usually fixed to a chassis of a product by contact adhesive to prevent the light pipe assembly from rocking, which is a disadvantage for transmission quality. However, utilizing contact adhesive is inconvenient when the light pipes are broken and need to be replaced.

DETAILED DESCRIPTION

Figure 1:
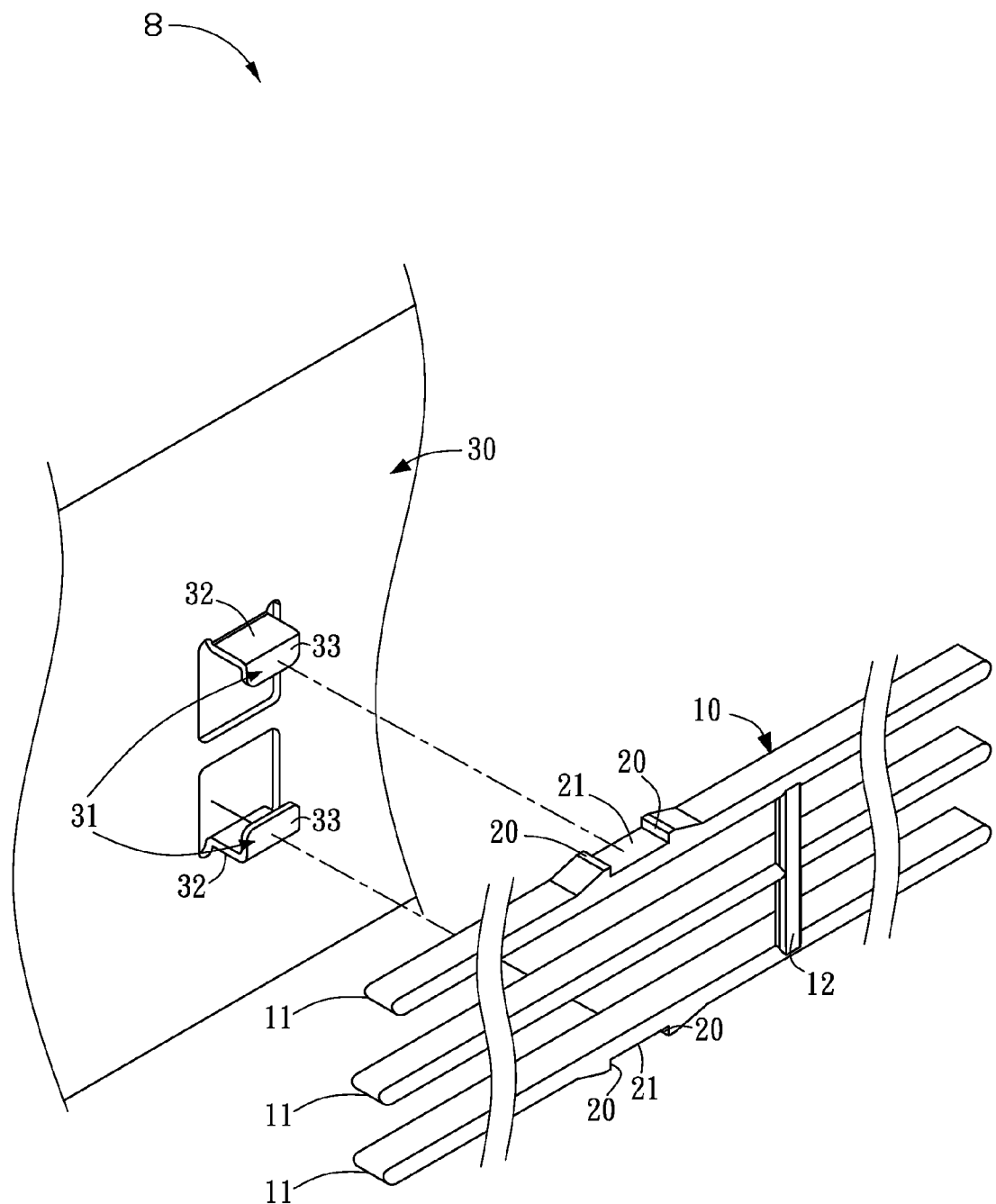
FIG. 1 is an exploded, isometric view of an embodiment of a fastening device.

Referring to FIG. 1, an embodiment of a fastening device 8 includes a light pipe assembly 10, and a chassis 30 of a product, such as a personal computer or a sever, for example The light pipe assembly 10 includes a plurality of horizontal light pipes 11 spacedly arranged from top to bottom, and a vertical connecting member 12 perpendicularly connecting the plurality of light pipes 11 to each other. One of the light pipes 11, located at a top of the light pipe assembly 10, includes two spaced wedge-shaped blocks 20 extending from a top of the light pipe 11. A side of each block 20 facing the other block 20 forms a vertical surface, and a side of each block 20 opposite to the other block 20 forms an angled surface. A clipping groove 21 is formed between the two blocks 20. One of the light pipes 11, located at a bottom of the light pipe assembly 10, also includes two spaced blocks 20 that are the same as the blocks 20 of the light pipe 11 at the top of the light pipe assembly 10, extending from a bottom of the light pipe 11 at the bottom of the light pipe assembly 10.

The chassis 30 includes two opposite L-shaped hooks 31. Each hook 31 includes a clipping portion 32 perpendicularly extending from the chassis 30, and a blocking portion 33 perpendicularly extending from a distal end of the clipping portion 32 towards the other hook 31.

Figure 2:
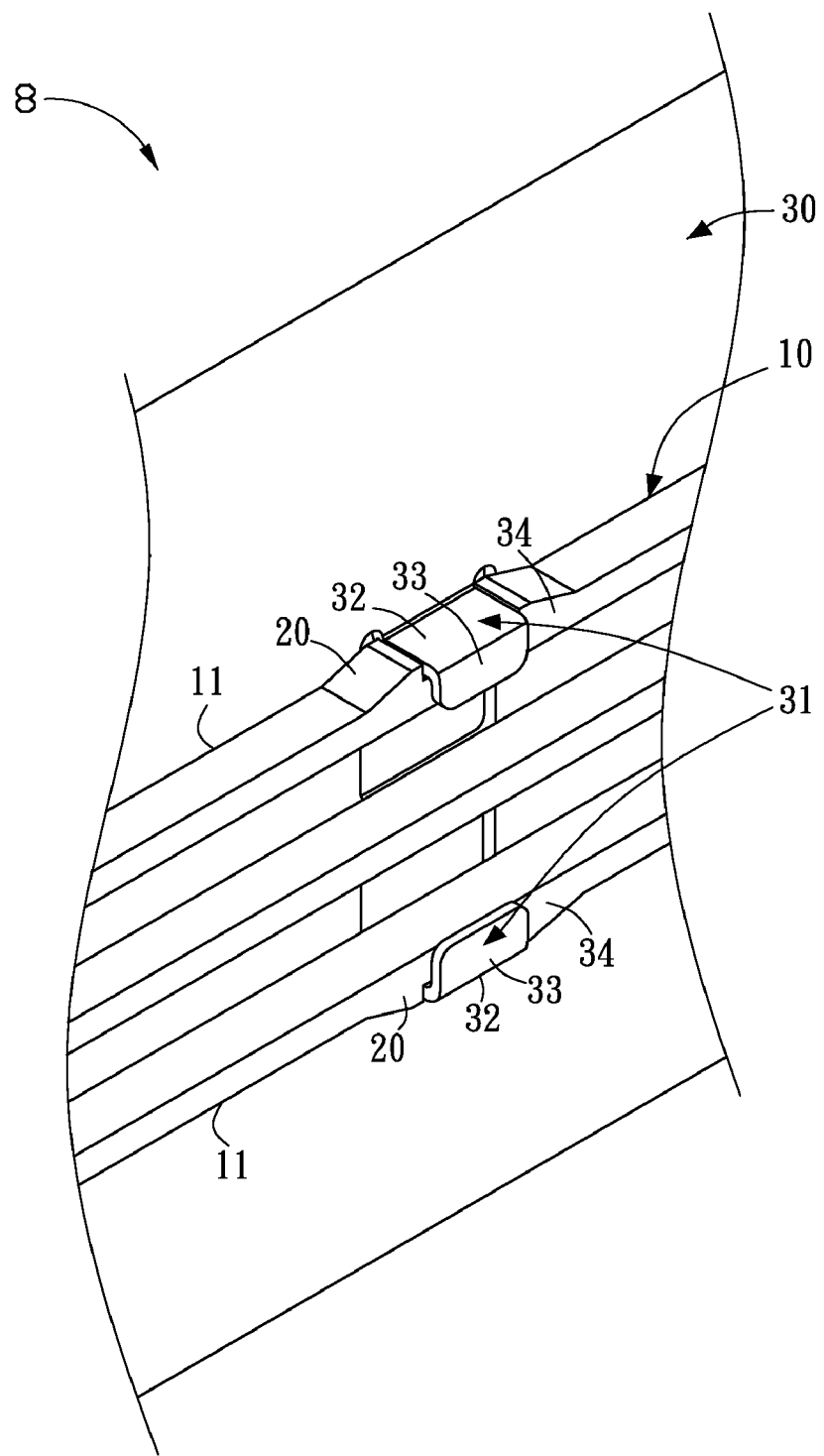
FIG. 2 is an assembled view of the fastening device of FIG. 1.
Figure 3:
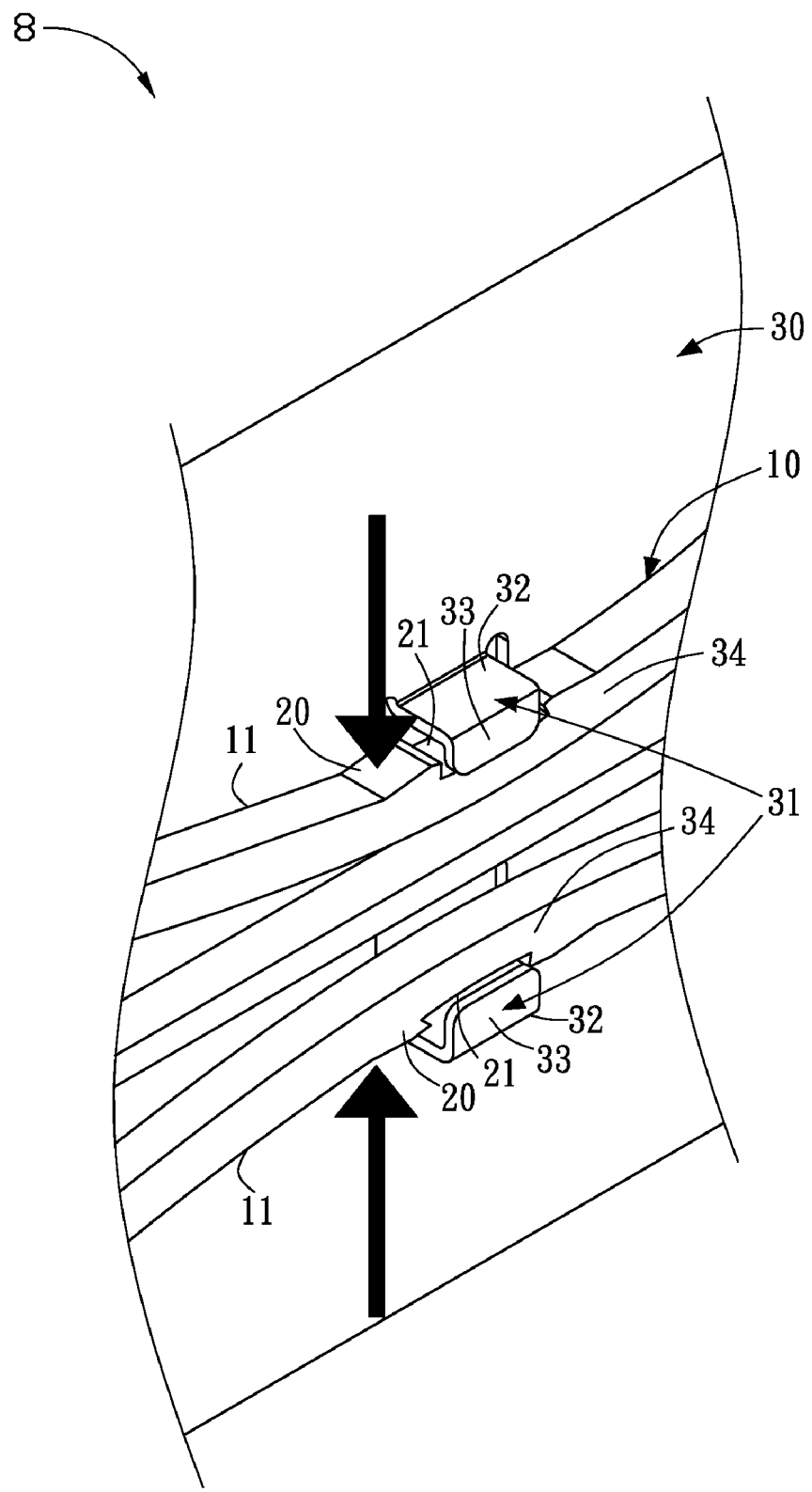
FIG. 3 is similar to FIG. 2, but showing the fastening device in step of assembly or disassembly.

Referring to FIGS. 2 and 3, in assembly, portions adjacent to the blocks 20 of the light pipes 11 at the top and bottom are compressed to elastically deform the light pipe assembly 10. The light pipe assembly 10 is placed between the hooks 31 of the chassis 30. The light pipe assembly 10 is relaxed to be restored. The clipping portions 32 of the hooks 30 are respectively engaged in the clipping grooves 21 of the light pipe assembly 10, to clip the light pipe assembly 10. The blocking portion 33 of each hook 30 abuts against a side 34 opposite to the chassis 30 of the corresponding light pipe 11. Therefore, the light pipe assembly 10 is firmly installed to the chassis 30.

In disassembly, the light pipe assembly 10 is compressed to be disengaged from the hooks 31. Therefore, the light pipe assembly 10 is ready to be disassembled from the chassis 30.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fastening device for fastening a light pipe assembly comprising a plurality of light pipes, the fastening device comprising:

a chassis comprising two opposite hooks; and two pairs of blocks extending from two of the plurality of light pipes located at opposite sides of the light pipe assembly respectively, wherein the two pairs of blocks are operable to engage with the corresponding hooks, to cause the hooks to sandwich the light pipe assembly therebetween;

wherein a clipping groove is formed between each pair of the two pairs of blocks, each of the hooks comprises a clipping portion extending from the chassis to engage in the corresponding clipping groove, and a blocking portion perpendicularly extending from a distal end of the clipping portion to resist against a side opposite to the chassis of the light pipe assembly.

2. The fastening device of claim 1, wherein a side of each block of a pair of blocks facing the other block of the pair of blocks forms a surface perpendicular to the corresponding light pipe, a side of each block of the pair of blocks opposite to the other block of the pair of blocks forms a surface angled to the corresponding light pipe.

3. An assembly comprising:

a chassis comprising two opposite hooks; and a plurality of light pipes connected together in parallel, a top one of the plurality of light pipes defines a groove to receive one of the hooks of the chassis, a bottom one of the plurality of light pipes defines a groove to receive the other one of the hooks of the chassis;

wherein two wedge-shaped blocks extend from each of the top and bottom light pipes, the groove are defined between the wedge-shaped blocks; and wherein each hook comprises a clipping portion perpendicularly extending from the chassis to engage in the corresponding groove, and a blocking portion perpendicularly extending from a distal end of the clipping portion towards the other hook to sandwich the corresponding one of the top and bottom light pipes between the blocking portion and the chassis.

\* \* \* \* \*